UNITED STATES PATENT OFFICE.

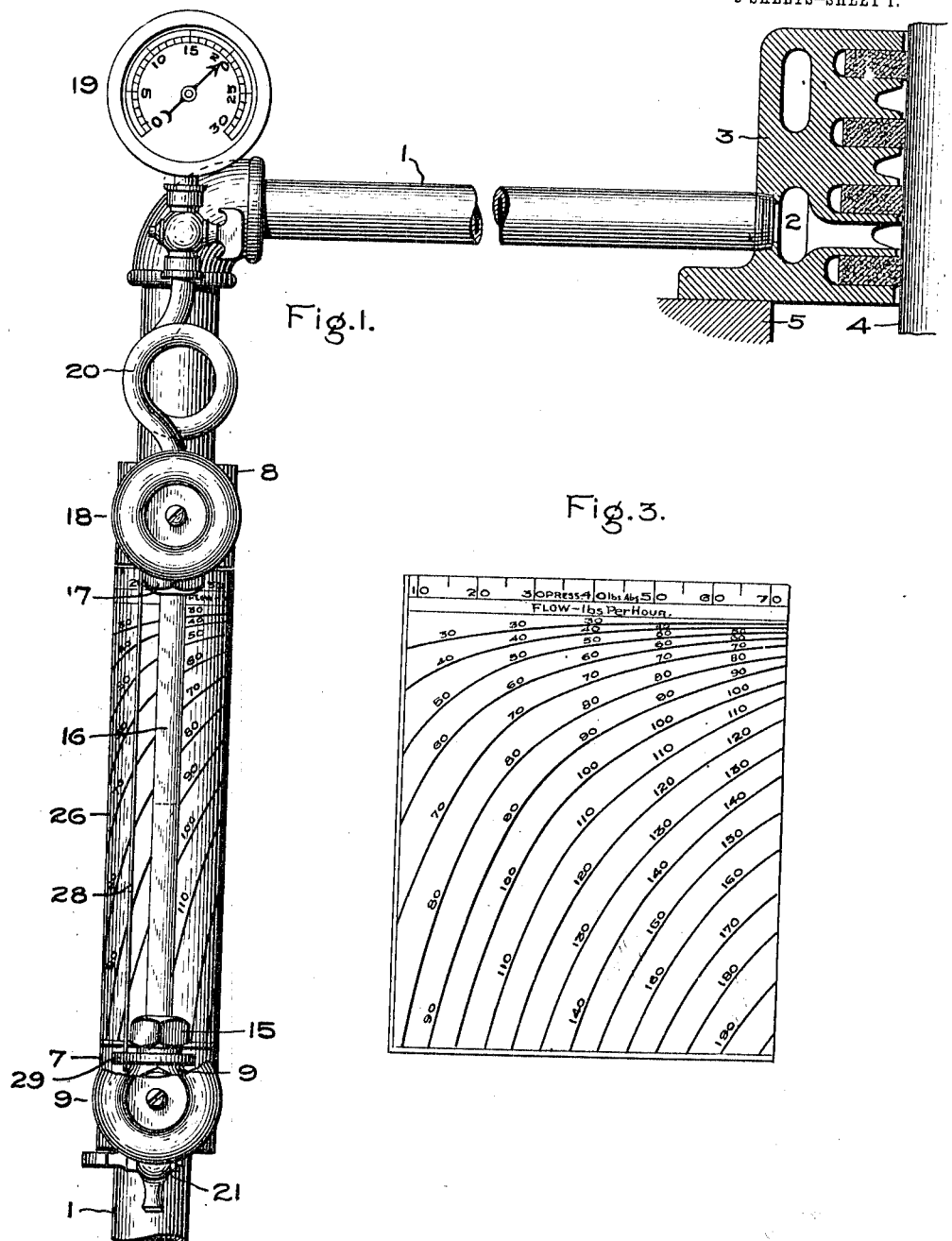

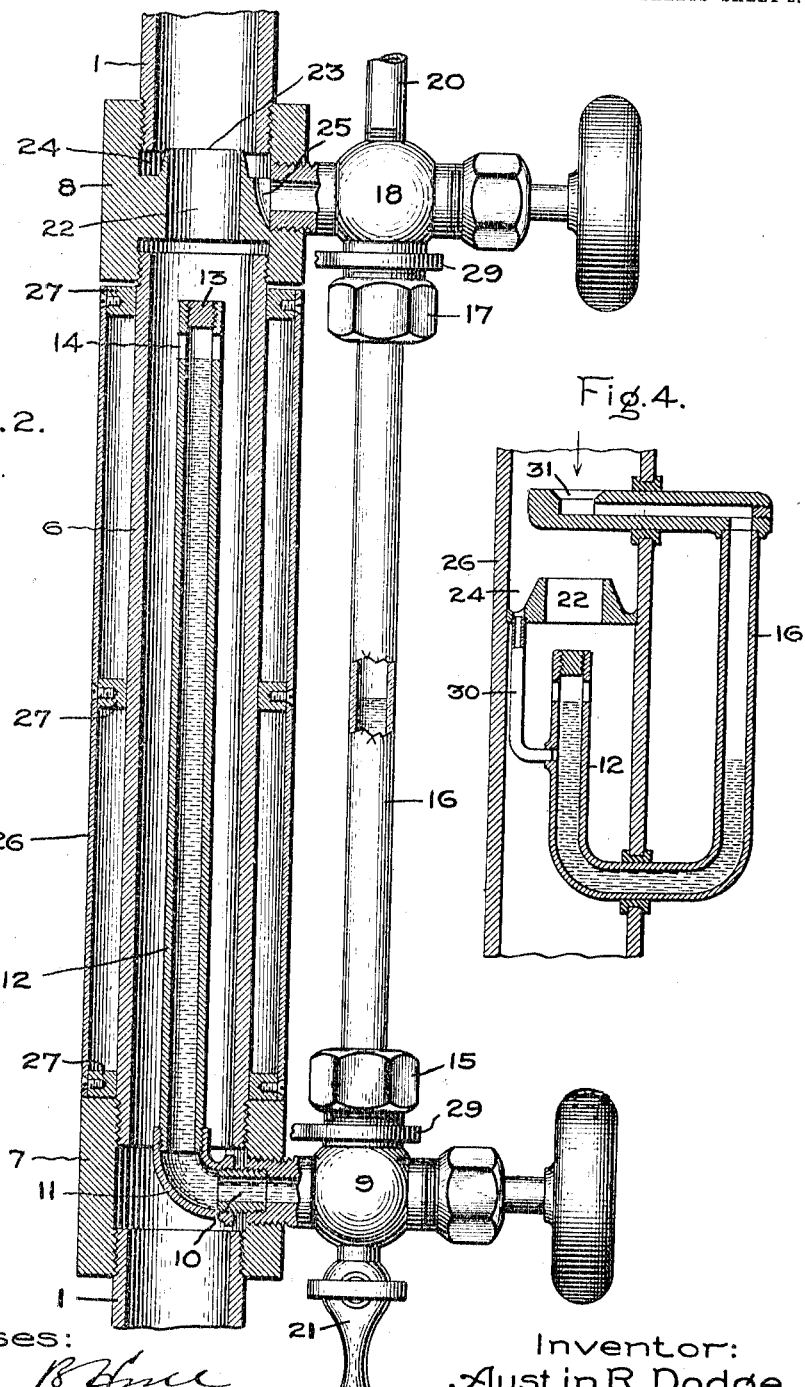

AUSTIN R. DODGE, OF SCHENECTADY, NEW YORK, ASSIGNOR TO GENERAL ELECTRIC COMPANY, A CORPORATION OF NEW YORK.

FLOW-METER.

1,096,894.
Specification of Letters Patent. Patented May 19, 1914.
Application filed September 30, 1909. Serial No. 520,429.

*To all whom it may concern:*

Be it known that I, AUSTIN R. DODGE, a citizen of the United States, residing at Schenectady, county of Schenectady, State of New York, have invented certain new and useful Improvements in Flow-Meters, of which the following is a specification.

This invention relates to apparatus for measuring the flow of steam or other fluid through a pipe or main in pounds weight per hour. It is especially designed to show the amount of leakage through the shaft packing of a steam turbine, but is applicable to many other situations. The meter or apparatus is mounted for direct connection with the steam main, a section of which is cut out to receive it. In a piece of vertical tubing of the proper length to connect the ends of said steam main is arranged one leg of a U-shaped meter tube, the other leg being a glass gage tube outside of said tubing and parallel therewith. The meter tube is connected with an annular trough inside the tubing which serves to collect water of condensation and convey it into said meter tube. When the device is not in use the water of condensation fills both legs of the tube to the same level, but when the steam column begins to move through the pipe or main the constriction produced by the annular trough causes an excess of pressure above said trough and in the leg of the U-tube connected therewith, which forces down the water in the glass tube to a point at which the pressure becomes balanced by the column of water in the other leg of the U-tube. A graduated scale behind the glass gage tube enables readings to be made in accordance with the varying positions of the top of the water column in said tube. If desired, a greater unbalancing of pressure may be obtained by inserting a Pitot nozzle into the steam main above the annular trough, and connecting said nozzle with the top of the gage tube. In this case it will be more convenient to connect the trough with the inner leg of the U-shaped meter tube.

In the accompanying drawings, Figure 1 is an elevation of my improved meter as applied to a shaft packing of a steam turbine, the packing being shown in section; Fig. 2 is a longitudinal section of the meter; Fig. 3 is a development of the cylindrical graduated scale, and Fig. 4 is a diagrammatic representation of a modification.

For illustrative purposes, the steam pipe or main 1 is shown as conveying leakage steam from a chamber 2 in a packing 3 for a vertical shaft 4 at a point where it passes through a casing 5 containing steam under pressure; such, for instance, as the casing of an upright turbine of the Curtis type. The pipe 1 could lead from the packing of a horizontal shaft if desired. The pipe runs to some convenient region, preferably to one where the energy of the steam can be utilized to a greater or less extent, and at some point where it is vertical the meter is inserted. This comprises a section of pipe or tubing 6, preferably of about the same diameter as the steam pipe 1, and provided at each end with a coupling 7, 8 to connect it with the adjacent ends of said steam pipe. A globe valve 9 is screwed into the lower coupling 7, and connected with its inner end by a short nipple 10 is an elbow 11 from which rises a tube 12, preferably in the center of the section 6, and terminating near the top of said section. The upper end of this tube is closed by a plug 13, but immediately below the plug are openings 14 in the walls of said tube. This tube forms the low-pressure leg of the meter tube. The globe valve is similar to those used with water gages on steam boilers, having on its upper side a socket and union 15 for the lower end of a glass gage tube 16, whose upper end is received in a union 17 on a globe valve 18 screwed into the upper coupling 8. A pressure gage 19 is connected with this upper globe valve by a pipe 20, and a pet cock 21 opens downwardly from the bottom of the lower valve 9. The interior of the coupling 8 forms a somewhat contracted throat 22 surrounded by an annular upwardly extending lip 23, which produces an annular trough 24. A duct 25 connects said trough with the upper globe valve. This constricted throat is thus located between the ends of the outer and inner legs of the U-shaped tube and produces a difference in pressure on opposite sides of it when the steam is flowing, in a manner well-known. Concentric with the pipe or tube section 6 is a cylinder 26 secured to spacing rings 27, which can rotate easily on said pipe section, the lower ring having a footing on the upper end of the coupling 7. The outer surface of the cylinder bears the graduations, lines and numbers constituting the scale shown in Fig. 3, which is a development of the entire surface of said cylinder. A wire 28 is arranged adjacent to and parallel with the gage tube 16, being preferably carried by flanges 29 on the globe valves.

The operation is as follows: So long as the steam in the pipe 1 is not flowing it exerts an equal static pressure in both legs of the meter tube. The water of condensation is collected by the trough 24 and gradually fills both legs of said tube up to the level of the openings 14. As soon, however, as the steam begins to flow, the unbalanced pressure above the throat 22 exerts a dynamic pressure on the column of water in the glass gage tube, depressing it until the pressure corresponding to the difference in heights of the water columns in the tubes 12 and 16 equals the pressure due to the excess in pressure of the steam above the constriction. As the water level lowers in the gage tube the excess water in the tube 12 runs out through the holes 14. The scale cylinder is then rotated until the wire 28 coincides with the number indicating the steam pressure as given by the gage 19. The intersection of the top of the water column in the gage tube with one of the curved lines on the scale gives a reading of the flow of steam in pounds weight per hour. In Fig. 1 the steam pressure is 20 pounds to the square inch, and the steam flow is about 85. The meter will give accurate readings so long as the water column in the gage tube is stationary or falling, but when it rises time must be given for the tube 12 to fill with water up to the opening 14, which is the datum level from which the height of the unbalanced portion of the water column in that tube is measured. Inasmuch, however, as the leakage of steam through the shaft packing is quite uniform or slightly increasing, the meter is satisfactory for all practical purposes.

In Fig. 4 the meter tube is shown diagrammatically as a continuous length of pipe, but it is to be understood that the actual construction would be as shown in Figs. 1 and 3, except for the fact that the annular trough 24 and the constricted throat 22 are placed lower down in the main and the trough is connected by a pipe 30 with the inner leg 12 of the meter tube, while the upper end of the outer glass gage tube 16 is connected to a Pitot nozzle 31 inserted through the wall of the steam main above the throat 22 and directed toward the steam column. This arrangement produces an increased unbalancing of the pressures in the two legs of the meter tube.

In accordance with the provisions of the patent statutes, I have described the principles of the operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a substantially vertically arranged fluid-conveying pipe, of a U-shaped meter tube having one leg arranged within said pipe and the other leg having its upper portion in communication with the pipe, said tube being adapted to contain a column of liquid, and means whereby an unbalancing of pressure is produced in the two legs of said tube by the flow of fluid through the pipe.

2. The combination with a vertically arranged fluid-conveying pipe, of a U-shaped meter tube having one leg arranged lengthwise in said pipe and the other leg composed of transparent material and communicating at its upper portion with said pipe, said tube being adapted to contain a column of liquid.

3. The combination with a vertically arranged fluid-conveying pipe, of a U-shaped meter tube having one leg arranged lengthwise in said pipe and the other leg outside of the same, there being a connection between the upper portion of the outside leg and the pipe, said tube being adapted to contain a column of liquid, and a constricted throat in said pipe between the ends of said inner and outside legs.

4. The combination with a vertically arranged steam-conveying pipe, of an upright U-shaped meter tube having one leg inside of said pipe and the other leg outside thereof, and means for collecting water of condensation and leading it into the tube.

5. The combination with a steam-conveying pipe having a vertically disposed portion, of a coupling at each end of said portion, a globe valve inserted into each coupling, a glass gage tube connecting said valves, and a tube connected with the lower valve and extending up inside said pipe.

6. The combination with a vertically arranged steam-conveying pipe, of a coupling at each end thereof, a globe valve inserted into each coupling, a glass gage tube connecting said valves, a tube leading from the lower valve up inside said pipe, and an annular lip on the upper coupling forming a groove and producing a constricted throat adjacent the upper end of said tube, there being a passage connecting the groove with the gage tube.

7. The combination with a vertically arranged fluid-conveying pipe, of a U-shaped meter tube having one leg arranged lengthwise therein and the other leg outside of and parallel with the same, there being a connection between the upper portion of the outside leg and the pipe, and a cylindrical scale rotatably mounted on said pipe adjacent to the outside leg.

8. The combination with a vertically arranged fluid-conveying pipe, of a coupling at each end thereof, a U-shaped meter tube having one leg inside and the other leg outside of said pipe, there being a connection between the upper portion of the outside leg and the pipe, and a cylindrical scale concentric with said pipe and rotatable thereon with its lower end resting on the lower coupling.

9. The combination with the shaft packing of a steam turbine, of a pipe leading from said packing, and a meter in said pipe for measuring the flow therethrough of steam leaking through said packing.

10. The combination with a steam-conveying pipe having a vertically disposed portion, of a glass gage tube arranged outside said portion in parallel relation thereto, a connection between the upper end of the tube and the pipe, a tube within the pipe extending longitudinally thereof, the upper end of said tube being closed and a lateral opening being provided in the wall of the tube adjacent said end, and a connection between the lower ends of said tube and gage tube.

11. In a fluid meter, the combination with a substantially vertically arranged fluid conveying pipe, of a U-shaped tube having one leg extending into the pipe, the other leg being outside the pipe, there being a connection between the upper portion of the outside leg and the pipe, said tube being adapted to contain a column of liquid, and a scale adjacent to the outside leg of the tube.

12. In a fluid meter, the combination with a vertically arranged fluid conveying pipe, of a U-shaped tube having one leg extending into the pipe, with the other leg outside of the pipe, there being a connection between the upper portion of the outside leg and the pipe, said tube being adapted to contain a column of liquid, means for producing a pressure difference in the legs of the tube having a definite relation to the flow through the pipe, and a scale rotatably mounted adjacent to the outside leg of the tube so that said scale can be adjusted to read the flow of fluid at different pressures.

13. In a fluid meter, the combination with a vertically arranged fluid-conveying pipe, of a U-shaped tube adapted to contain a column of liquid, one leg of the U-tube extending into the pipe and the other leg being outside of said pipe, and means connecting the end portions of the U-tube with the interior of the pipe, said means including a Pitot nozzle or tube in communication with one leg of said tube.

14. In a fluid meter, the combination with a substantially vertically arranged main or pipe, of a U-tube adapted to contain a column of liquid, one leg of which is located outside the main and the other leg of which is located within the main and is closed against the impact of the fluid flowing therein, said last named leg having an orifice through which liquid collecting in the tube may be discharged, means for supporting the tube in relation to the main, means for creating a pressure difference on the ends of the column that has a definite relation to the rate of flow of fluid through the main, and means bearing a scale arranged adjacent to the leg of the tube which is outside of the main.

15. In a fluid meter, the combination with a vertically disposed main or pipe, of a U-tube, one leg of which is located in the main, means for supporting the tube on the main, said tube being adapted to contain a column of liquid, means including a Pitot tube for creating a pressure difference on the ends of the column that has a definite relation to the rate of flow, and a scale arranged adjacent to one of the branches of the tube, said scale being adjustable to compensate for changes in the condition of the fluid.

16. In a fluid meter, the combination with a vertically arranged main or pipe, of a U-tube having the upper end portions of its branches in communication with the pipe, means supporting the tube on the pipe, a valve that controls the communication between the lower ends of the branches, and a valve that controls the communication between the upper end of one branch and the pipe, the upper end of the other branch being in open communication with the pipe.

17. In an apparatus of the character described, the combination of a section of tubing, couplings thereon to which the adjacent ends of the main to be metered are adapted to be connected, a U-tube adapted to contain a column of liquid, one leg of which is located within the tubing, is closed at one end against the impact of the fluid flowing in the main and tubing and has an orifice through which fluid can escape, the other leg being located outside of said tubing, a device in the main adapted to establish a higher pressure in the outside than in the inside leg of the U-tube which varies in response to variations in the rate of flow of fluid through the main, said device also supplying liquid to the tube, and means bearing a scale with which the displacement of the liquid in the U-tube can be compared.

18. In an apparatus of the character described, the combination of a section of tubing, couplings thereon to which the adjacent ends of the main to be metered are adapted to be connected, a U-tube that is supported by one of the couplings, one of its legs being located in the tubing and the other outside of it, and a device supported by the other coupling adapted to establish a pressure in the U-tube corresponding to the rate of flow of the fluid being metered, which pressure is balanced by the liquid in the tube, said device also supplying liquid to said tube.

In witness whereof, I have hereunto set my hand this 29th day of September, 1909.

AUSTIN R. DODGE.

Witnesses:
F. J. SEABOLT,
HELEN ORFORD.